United States Patent Office 3,429,732
Patented Feb. 25, 1969

3,429,732
LIGHT SENSITIVE ARTICLE COATED WITH VIRGIN POLYVINYL CHLORIDE AND ULTRAVIOLET LIGHT ABSORBER
William Frederick Baitinger, Jr., Belle Mead, N.J., assignor to American Cyanamid Company, Stamford, Conn., a corporation of Maine
No Drawing. Filed May 10, 1965, Ser. No. 454,744
U.S. Cl. 117—33.3
Int. Cl. B32b 33/00; C08f 45/54
12 Claims

ABSTRACT OF THE DISCLOSURE

A light stable composition comprising in combination a polymeric material which is sensitive to ultraviolet radiation and on the surface of said polymeric material a coating consisting essentially of virgin poly(vinyl chloride) and 2 to 15% by weight of the poly(vinyl chloride) of an ultraviolet light absorber. The surface coating acts as a protective screen capable of serving as a barrier to ultraviolet radiation and thereby protects the polymeric substrate from degradation by the action of said radiation.

---

This invention relates to a means for stabilizing polymeric materials against the deteriorating effects of ultraviolet radiation. It relates also to the stabilized polymeric materials obtained by the practice of this method. More particularly, the present invention provides a light-stable poly(vinyl chloride) composition which is extremely light-stable in and of itself and is capable of use as a U.V. screening composition for the protection of less light-stable compositions.

The instability to light of many polymeric materials is a well-recognized phenomenon. Many plastics would deteriorate in a matter of a short exposure to the sun's rays were they not in some way protected either by the addition of a stabilizing additive or the interposition of an ultraviolet light barrier between the sensitive material and the light source. Either approach can provide a degree of protection which makes an otherwise useless material, useful for outdoor applications. However, the degree of protection which has thus far been achieved has not removed instability to light as a significant shortcoming in the outdoor usage of some plastic materials.

In general, the degree of stability which a particular U.V. absorber may impart, increases to a certain point with concentration of the additive. Beyond this point, higher concentrations do not increase stability of the plastic material and may even detract from it. Thus, there is a limit to the protection which can be obtained from a given stabilizer. It is also true that increasing the amount of stabilizer to give increased protection may raise new problems of color, where clarity is desired; compatibility or solubility of the additive in the plastic substrate; and loss of desirable physical properties of the plastic.

Up until the present invention, U.V. absorbing screens, for the most part, have not provided a suitable alternative to the incorporation of light stabilizers into the plastic substrate. The screening substrate which is used in making the U.V. screen is generally a plastic material which itself is light-unstable. While the screening substrate can be selected so as to have both maximum light stability and compatibility with the stabilizing additive, most screening substrates are themselves too sensitive to light to make the extra trouble involved in using a screen worthwhile.

For many uses, the degree to which certain polymers can be stabilized against light, is adequate. These are not always possessed of the necessary structural strength and optical properties. Many plastic materials, though structurally adequate, are not sufficiently light stable, even with presently available additives. They cannot be used as building materials for this reason. This is the case with rigid vinyl chloride polymers which, in sheet form, are very strong and optically excellent. This material, though otherwise excellent for building purposes, is one of the least light-stable plastics. Many other plastic materials, both pigmented and clear, have been similarly rejected for outdoor usage.

In view of this state of the art, it is an object of the present invention to provide certain plastic materials in a form such that they can remain stable to light for heretofore unattainable periods. It is a further object of this invention to provide a method whereby a plastic material can be rendered extremely stable to light. It is still another object of this invention to provide a poly(vinyl chloride) composition which is capable of conferring light stability upon other polymeric materials by serving as a U.V. absorbing screen therefor.

The present invention is based upon the discovery that poly(vinyl chloride) which does not have a heat-history from having been subjected to the high temperatures encountered in milling, molding and extruding operations (hereinafter referred to as "virgin PVC"), has virtually unlimited stability to light and can be easily compounded with known light-stabilizing additives. The composition of virgin PVC and one or more light stabilizers is not only stable in itself, but is able to stabilize other plastic materials when it is interposed between the plastic material and the light source. Whether or not the virgin PVC material containing the light-stabilizing additive is fused to the substrate to be protected, the degree of protection is the same and is so great as to make heretofore unstable materials very suitable for applications involving prolonged and severe light exposure. It is critical for the attainment of the advantages of the present invention that PVC which has never been milled, molded or extruded at high temperatures, be used as the matrix for the U.V. screen. By "high temperature" is meant any temperature above the softening point of poly(vinyl chloride). Exposure to a temperature of 140° C.–150° C. for under a half-hour, does not materially interfere with the suitability of virgin PVC for use in this invention. Temperatures of this magnitude can be tolerated for short periods. Elevated, but lower temperatures can be tolerated for lengthier periods of time. The fact to keep sight of is that heating PVC to its softening point (as defined in standard terms) destroys it for purposes of the present invention. Heating to temperatures just below the softening point may have the same effect if the heating period is sufficiently lengthy. By contrast, the same temperatures may be applied for a short time without adverse effect. Thus, whether exposure to a given high temperature below the softening point is damaging, depends not only on the temperature, but on length of exposure. When the combination of these two factors is destructive to the light stability of the PVC, the latter is not suitable for use herein. This can be determined by simple testing procedures.

The virgin PVC screen can be formed by casting, dipping or spraying a solution of unheated or "virgin" PVC in a suitable solvent. The U.V. absorber can be combined with the virgin PVC in the solvent from which the film or sheet will be formed. Thus, upon spraying, dipping or casting the PVC-light stabilizer solution so as to deposit a film and evaporate the solvent, the protective screen of the present invention will be formed. The film may be deposited directly upon the surface of the plastic to be protected, in which case it becomes an integral part of the plastic surface; or else the protective screen of this invention may be made as a self-supporting film which can be used as a wrapping material or else can be adhered with a suitable adhesive, to the material to be protected.

The particular method used to form the film and the details of using the film may follow conventional procedures for using and forming plastic films.

The present invention provides a suitable means for conferring light stability upon plastic materials which are not, in themselves, light stable. The materials which can be protected advantageously fall into a wide range of chemical compositions. Representative of these are polyolefins such as polyethylene and polypropylene; styrene polymers including the homopolymer of styrene and copolymers of styrene; polycarbonates; polyesters including adipic acid-glycol and terephthalic acid-glycol condensation products, as well as isocyanate derivatives thereof; acrylic ester polymers and copolymers including polymethylmethacrylates and analogs thereof; melamine-formaldehyde reaction products and analogs thereof; and vinyl chloride polymers.

Decorative laminated structures, including plastic laminated articles which are useful as counter-tops, wall panelling and for exterior building construction and trim work, can also be manufactured with the U.V. screen of this invention. High pressure laminates prepared by this invention are composed of three elements, namely (1) a rigidity imparting base member (e.g., wall board, multiply heavy paper, or a rigid plastic sheet such as rigid PVC, poly(methyl methacrylate), etc.), (2) a print sheet member directly bonded to such base member, and (3) an over-lay sheet composed of the virgin PVC-U.V. absorber plastic of the present invention.

In this type of laminated structure, the base member is frequently built up of a number of plies of a paper such as kraft paper, impregnated with a resin, and assembled and consolidated under heat and pressure. In general, the function of the core member of the laminate is to give the total laminate structural strength while, at the same time, using the very minimum of material to achieve such purpose.

The print sheet member of the laminate supplies a decorative effect to the laminate and, in preparing the assembly for lamination is usually placed on top of the base or core member and pressure bonded thereto. The print sheet may be pure or impregnated alpha cellulose paper, absorbent regenerated cellulose or an acrylonitrile plastic sheet either with or without an additional impregnated polymeric adhesive, such as a suitable aminotriazine aldehyde resin. On the surface of the print sheet there is usually printed a design which has been dyed or pigmented to give solid color to the paper. These designs may be of any and all types but do have the requirement of being composed of nonbleeding inks. The most important property of the print sheet is that it contribute to the laminate its property of good appearance and durability. This advantage has frequently in the past been attained by the use of a melamine formaldehyde resin in the composition which gives a degree of color stability, abrasion resistance and inherent hardness to the print sheet.

Conventional print sheet members are used to form the decorative laminated article of this invention. Among the suitable materials are cellulosic substances, such as high grade, absorbent, regenerated α-cellulose paper which has been printed with a design or dyed or pigmented to impart a solid color thereto. Another useful print sheet material is a sheet of fibrillated wet-spun filaments of a polymer of acrylonitrile. These acrylic fiber sheets are known in the paper-making art, for example U.S. Patents 2,810,646 and 3,047,455. Other materials are kraft paper, vinyl sheets, cotton fabrics, linen fabric, glass fiber fabric, polyester resin fibers, linear superpolyamide fibers, and the like. Printed designs having an unlimited range or form of artistic effect may be employed, so long as the inks or other coloring matter contained therein are nonbleeding in the curable resinous compositions with which the sheet is subsequently saturated and/or coated. It should be noted that these inks or colorants will preferably be resistant to fading under outdoor conditions. In addition, the filaments making up the print sheets may contain minor amounts of such materials as are normally present in textile fibers, e.g., delusterants, antistatic agents, and the like, while the print sheets themselves may also contain minor amounts of any of the softening agents, sizes, coating materials and the like commonly employed in the manufacture of paper.

The print members may be used as such or they may be preimpregnated with known aminotriazine aldehyde thermosetting resins. These resins, as well as the techniques for their preparation, are shown for example in U.S. Patent Nos. 2,197,357 to Widmer et al. and 2,260,239 to Talbot.

It is practical to stabilize polymers which have been made relatively stable through use of prior methods, to an even greater degree, by the conjoint use of the present invention with known stabilization procedures. However, the benefit of the present invention is most valuable in the protection of polymeric materials which have never before been prepared in an extremely light-stable form. Among such polymers are rubbery polymers [such as butadiene-styrene, butadiene-acrylonitrile, butadiene-isobutylene, and ethylene-propylene copolymers; also blends of polymers containing acrylonitrile, butadiene and styrene (referred to as "ABS polymers"), and chlorosulfonated polyethylene], also polystyrene, polycarbonates, and especially molded or extruded poly(vinyl chloride) polymers. These materials have been more restricted than most polymers by their instability to light because light stabilizers thus far developed, while adequate and even excellent in some cases, have very little beneficial effect in these. By screening ultraviolet radiation from these polymers with the U.V. screen of the present invention, light stability can be achieved which matches, and even surpasses, previous attainments with polymers which have been successfuly stabilized. The surprising effect of the present invention is most apparent in the stabilization of rigid PVC.

By "rigid PVC" is meant a vinyl chloride polymeric composition containing no plasticizer and having heat stabilizers, which composition is shaped by high temperature molding or extruding operations. Homopolymers and copolymers such as vinyl chloride-vinyl acetate, vinyl chloride-vinylidene chloride and vinyl chloride-acrylonitrile are included. When rigid PVC containing conventional light stabilizers in normal concentrations is exposed to light, it deteriorates as indicated by the development of color in a very short time. While the length of time may vary with the particular light stabilizer used, in no event is a degree of stability attained which is satisfactory, where long-term durability is required. This relative ineffectiveness of U.V. absorbers can be overcome to some degree by the addition of various auxiliary compounds which synergistically operate with the U.V. absorber to enhance the degree of protection. Such an approach is disclosed in commonly assigned copending applications Ser. No. 386,383, filed July 30, 1964 and Ser. No. 386,386, filed July 30, 1964, and now abandoned.

When a rigid PVC composition with or without added light stabilizer is protected with a coating of virgin PVC containing an effective concentration of a light stabilizer, the increase in stability of the rigid PVC substrate is remarkable. With certain stabilizers, a ten-fold increase in stability can be attained by incorporating the light stabilizer in the form of a virgin PVC film rather than in the body of the light-sensitive plastic itself. A rigid PVC sheet coated with the virgin PVC screen of this invention is an unprecedented achievement in that the polymeric make-up of the sheet is exclusively PVC and yet the material is remarkably stable to light.

While the benefits of the present invention are achieved when the polymer which is to be protected does not have any light stabilizer, it may, nevertheless, be desirable to incorporate in the polymer, conventional amounts of stabilizer to take care of the eventuality that the protective virbin PVC–U.V. absorbing screen may be scratched or broken during the actual usage.

Not only is the virgin PVC screen of the present invention useful for protecting plastics and resins against light degradation, it is possible to use the U.V. absorbing screen of the present invention as a coating for paper and textile fibers which may, in themselves, be stable, but which may be colored or filled with relatively light-unstable colorants and fillers, respectively. Thus, for example, a textile fiber such as cotton, dyed with a light-sensitive blue dye, if coated with the U.V. screen of the present invention, could retain its original color for a much longer period than an unprotected fabric.

To form the PVC-U.V. absorber screen of this invention, the general procedure is to dissolve virgin PVC in a solvent which is capable of also dissolving the U.V. absorber to be used. The concentration of U.V. absorber in this solution should be adjusted to be about 0.5% to 15%, preferably at least 2.0% and, most preferably, at least about 5% of the virgin PVC content of the solution. Other materials may be sparingly added to the solution including fillers, extenders, colorants, plasticizers, heat stabilizers and antioxidants. After the solvent mixture is formed and all components are thoroughly dissolved, a film or sheet having a thickness of 0.5 to 5 mils, may be formed by spraying or casting the solution onto a surface or by dipping the material to be protected into the solution. In any event, the film which is formed will exert its protective effect as above-described. If the film is formed upon a surface from which it can be stripped, the stripped film can be used as a U.V. screen by pressure-laminating it onto the surface of a material to be protected. To obtain a good bond between the screening film and the surface, a suitable adhesive may be used or else the film can be welded onto the surface by solvent action. If heat is used to bond the protective screen in place, care should be taken not to allow the screen to be heated above the softening point of the virgin PVC screen. Preferably, the screen should not be heated above temperatures of 150° C.

Solvents which have been found to be useful in the practice of the present invention are tetrahydro-furan (THF), dioxane, tetrahydropyran, and Cellosolve type solvents. Other solvents such as cyclohexanone, methyl ethyl ketone and methyl isobutyl ketone may be used, but it is extremely important to remove substantially all traces of such ketonic solvents from the virgin PVC film before exposure for any length of time to U.V. radiation. The carbonyl group seems to have an adverse effect on the stability of the light-sensitive polymeric substrate. To drive off substantially all the ketonic solvent from the coated composition, it is desirable to dry it at a moderately elevated temperature. After a few hours of standing at room temperature, the film may be put into an oven at a temperature between 50 and 90° C. for four to eighteen hours and this will normally serve to drive off remaining traces of solvent.

Any type of U.V. absorber suitable for PVC may be used to form the protective PVC screen of this invention. The preferred types are the 2-hydroxybenzophenones and the 2-(2-hydroxyphenyl)benzotriazoles exemplified, respectively, by 2-hydroxy-4-methoxybenzophenone and 2-(2-hydroxy-5-methylphenyl)benzotriazole. The latter compound is the preferred U.V. absorber for the purposes of this invention. Examples of classes of U.V. absorbers which may be used are:

(a) 2-hydroxybenzophenones:

2-hydroxy-4-methoxybenzophenone,
2,4-dihydroxybenzophenone,
2,2'-dihydroxy-4-methoxybenzophenone,
2,2',4,4'-tetrahydroxybenzophenone,
2,2'-dihydroxy-4,4'-dimethoxybenzophenone,
2-hydroxy-4-butoxybenzophenone,
2-hydroxy-4-octyloxybenzophenone,
2-hydroxy-4-dodecyloxybenzophenone,
2,2'-dihydroxy-4-octyloxybenzophenone,
4'-chloro-2-hydroxy-4-octyloxybenzophenone, etc.

(b) Benzotriazoles having a 2-(2-hydroxyphenyl) group: 2-(2-hydroxy-5-methylphenyl)benzotriazole, 2-(2-hydroxy-5-octylphenyl)benzotriazole, 2-(2-hydroxy-4-methoxyphenyl)benzotriazole, etc. These are disclosed in U.S. Patent 3,004,896, issued Oct. 17, 1961.

(c) Esters: Phenyl salicylate, tertiary-butylphenyl salicylate, phenyl resorcylate, p-octylphenyl benzoate, bis(p-nonylphenyl)isophthalate, bis(p-nonylphenyl)terephthalate, etc.

(d) Tris-aryltriazines in which at least one aryl group has an o-hydroxy substituent: 2,4,6-tris(2-hydroxy-4-octyloxyphenyl)-s-triazine, 2-(2-hydroxy-4-octyloxyphenyl)-4,6-dixylyl-s-triazine, etc. These compounds are the subject of U.S. Patent 3,118,887, issued Jan. 21, 1964, to Hardy et al.

(e) Benzothiazoles: 2-(4-methoxyphenylimino)-3-ethylbenzothiazole, 2-phenylimino-3-ethylbenzothiazole, etc.

(f) Benzylidene-malonic esters: Diethyl p-methoxybenzylidenemalonate, diethyl o-methoxybenzylidenemalonate, diethyl p-hydroxybenzylidenemalonate, diethyl diphenylmethylenemalonate, etc. This class of ultraviolet absorbers is disclosed in copending application of Susi, Ser. No. 362,182, filed Apr. 23, 1964.

(g) Arylaminoethylenes: N-methyl-p-methoxyanilinomethylenemalonitriles disclosed in U.S. Patent 3,079,366.

(h) Guanidines of the 1,2-dibenzoyl-3-arylguanidine class (disclosed in application Ser. No. 386,386, filed July 30, 1964) as exemplified by 1,2-dibenzoyl-3-(p-methoxyphenyl)guanidine, 1,2-dibenzoyl-3-(p-chlorophenyl)guanidine, 1,2-di-(p-methoxybenzoyl)-3-(p-methoxyphenyl)guanidine, and the like.

The invention is illustrated by the following examples in which parts and percentages are on a weight basis.

EXAMPLE 1

The protective capacity of virgin PVC film having a U.V. absorber is illustrated in this example by coating a rigid PVC chip with the film and exposing the resulting composite to U.V. radiation until a given degree of yellowness develops. For purposes of comparison, a control sample with no U.V. absorber and no coating, a control sample with a virgin PVC coating having no U.V. absorber and a sample of uncoated rigid PVC having U.V. absorber incorporated directly in the substrate are also exposed until the same degree of yellowness develops. The number of hours for which a sample can take U.V. radiation before developing the noted degree of yellowness, is a measure of its light stability. Degree of yellowness is measured with a Colormaster differential colorimeter and is expressed in Yellow Index units. When U.V. exposure has increased the degree of yellowness by 15 Yellow Index units ($\Delta YI=15$), the sample is removed from the U.V. light source and the number of hours of exposure is noted.

Preparation of samples

Rigid poly(vinyl chloride) chips were prepared by the usual procedure of weighing the desired formulation and blending it by tumbling for 16 hours. The blended mixtures were milled on a two-roll laboratory mill for five minutes at 170° C. and were compression-molded at 180° C. to obtain 50 mil plaques. For an uncoated control chip, the following clear PVC formulation was used:

| | Parts |
|---|---|
| Geon 103 EP PVC | 100 |
| Thermolite 31 (M & T) | 2.0 |
| Stearic acid | 0.5 |

For the uncoated chip having U.V. absorber incorporated therein, the same formulation with 0.5 part of 2-hydroxy-4-methoxybenzophenone (UV–A) as the U.V. absorber, was used.

To prepare coated chips, surface coatings were applied by dipping molded chips into a solution of Geon 103 EP PVC (10% resin solids) in tetrahydrofuran. Except for the control, the solution also contained 5% (based on resin solids) of UV-A. At least three dippings were required to insure a minimum film thickness of one mil. The samples were air-dried for one hour between dippings, and overnight after the final dipping to allow evaporation of most of the residual solvent. In every instance, a transparent film, permanently bonded to the rigid PVC chip, was obtained.

Experimental details

The samples were exposed to U.V. radiation in a Fluorescent Sunlamp-Black Light unit (FS-BL) and the number of hours before a $\Delta YI=15$ was observed. The findings are reported in the following Table 1A.

TABLE 1A

| No. | Sample | IYI [1] (units) | Time (hours) to $\Delta YI=15$ |
|---|---|---|---|
| 1 | Control | 3 | 150 |
| 2 | Control plus PVC coating [2]—no U.V. absorber | 3 | 150 |
| 3 | UV-A (0.5%) in rigid PVC | 3 | 295 |
| 4 | Rigid PVC plus coating containing 5% UV-A [2] | 3 | 4,400 |

[1] IYI=Initial Yellow Index, i.e., degree of yellowness before light exposure.
[2] A 5% concentration of UV-A in the one mil coating is equivalent to 0.1% based on the combined weight of the virgin PVC coating and substrate.

EXAMPLE 2

Using the procedure described in Example 1, chips of rigid PVC were coated with virgin PVC containing various U.V. absorbers. These chips, along with uncoated PVC chips containing incorporated U.V. absorber were then exposed and the yellowing observed. The time of exposure to $\Delta YI$ of 15 was noted and is reported in Table 2A.

The following U.V. absorbers were used in the tests:

U.V. ABSORBERS

| Symbol | Structure |
|---|---|
| UV-A | 2-hydroxy-4-methoxy benzophenone. |
| UV-B | 2-(2-hydroxy-5-methylphenyl)benzotriazole. |
| UV-C | 2-(2-hydroxy-4-methoxyphenyl)benzotriazole. |
| UV-D | 2,4,6-tris-(2-hydroxy-4-octyloxyphenyl)-s-triazine. |
| UV-E | 2,4-bis-(2,4-dimethylphenyl)-6-(2-hydroxy-4-octyloxyphenyl)-s-triazine. |
| UV-F | (p-Methoxybenzylidene)malonic acid, diethyl ester |
| UV-G | N-methyl-p-methoxy anilino methylene malononitrile. |
| UV-H | 1,2-di-(4-methoxybenzoyl)-3-(4-methoxyphenyl)guanidine. |

TABLE 2A

| U.V. absorber | Uncoated rigid PVC, 0.5% absorber (in polymer) | | Rigid PVC coated with virgin PVC containing 5% [1] absorber | |
|---|---|---|---|---|
| | IYI | Time (hours) to $\Delta YI=15$ | IYI | Time (hours) to $\Delta YI=15$ |
| Control | 2 | 135 | 3 | 120. |
| UV-A | 3 | 380 | 3 | 4,100. |
| UV-B | 3 | 505 | 3 | $\Delta YI=2$ at 4,500 hours. |
| UV-C | 3 | 350 | 3 | $\Delta YI=4$ at 4,500 hours. |
| UV-D | 10 | 320 | 7 | 1,400. |
| UV-E | | | 3 | 3,500. |
| UV-F | 2 | 455 | 3 | 2,600. |
| UV-G | 3 | 715 | 3 | 2,650. |
| UV-H | 3 | 640 | 3 | 2,900. |

[1] A 5% concentration of U.V. absorber in the one mil coating is equivalent to 0.1% concentration based on the combined weight of the coating and the substrate.

EXAMPLE 3

Using the procedure described in Example 1, pigmented PVC chips were coated with virgin PVC-U.V. absorber films and the samples were exposed to U.V. radiation until $\Delta YI=15$. The pigmented PVC formulation had the following composition:

| | Parts |
|---|---|
| Geon 103 EP PVC | 100 |
| TiO₂ (OR 450) | 1–2 |
| Thermolite 31 (M & T) heat stabilizer | 2.0 |
| Stearic acid | 0.5 |
| U.V. absorber (when used) | 0.5 |

The results are reported in Table 3A.

TABLE 3A.—TiO₂ PIGMENTED RIGID PVC

| U.V. absorber | 0.5% Absorber (In polymer) | | PVC coating containing 5% absorber | |
|---|---|---|---|---|
| | IYI | Time (hours) to $\Delta YI=15$ | IYI | Time (hours) to $\Delta YI=15$ |
| Control | 2 | 470 | 2 | 470. |
| UV-A | 2 | 495 | 4 | 3,700. |
| UV-B | 2 | 660 | 3 | $\Delta YI=4$ at 4,250 hours. |
| UV-C | | | 3 | $\Delta YI=6$ at 4,250 hours. |
| UV-E | | | 4 | 1,600. |
| UV-F | 2 | 495 | 3 | 2,400. |
| UV-G | 2 | 691 | 2 | 3,750. |
| UV-H | | | 3 | 2,300. |

EXAMPLE 4

Using the method described in Example 1, experiments were conducted to show the stabilizing effectiveness of virgin PVC film with U.V. absorber for various other plastics. Results are shown in the tables which follow.

TABLE 4A.—POLYMER CONTAINING 0.5% U.V. ABSORBER IN SUBSTRATE

| Polymer | Time (hours) of exposure (FS-BL) to $\Delta YI=15$ | | | |
|---|---|---|---|---|
| | UV-A | UV-B | UV-C | UV-E |
| Rigid PVC | 400–500 | 500–700 | 350 | |
| Pigmented (TiO₂) PVC | 495 | 600 | | |
| "Cycolac" Pigmented (TiO₂) ABS | 700–800 | 700–800 | 700–800 | 700 |
| "Laminac" 4123 Polyester | 700–800 | 700–800 | | |

TABLE 4B.—SAMPLES COATED WITH THIN VIRGIN PVC FILM CONTAINING 5% U.V. ABSORBER

| Polymer | Time (hours) of exposure (FS-BL) | $\Delta(YI)$ For sample containing [1]— | | | |
|---|---|---|---|---|---|
| | | UV-A | UV-B | UV-C | UV-E |
| Rigid PVC | 3,500 | 11 | 2 | 4 | 15 |
| Pigmented rigid (TiO₂) PVC | 2,500 | 10 | 2 | 3 | [2] >18 |
| "Lustran" Pigmented (TiO₂) ABS | 2,200 | [2] 20 | 7 | 9 | 4 |
| "Cycolac" Pigmented (TiO₂) ABS | 3,000 | 11 | 10 | 14 | 7 |
| "Laminac" 4123 Polyester | 3,500 | 4 | 5 | 5 | 9 |

[1] None of these samples, except for one PVC and one ABS sample, had reached $\Delta Y.I.=15$ at the time this data was compiled.
[2] These samples reached $\Delta Y.I.=15$ at about 1,900 hours of exposure.

EXAMPLE 5

Using the procedure described in Example 1, additional determinations were made using various virgin PVC films having various U.V. absorbers on rigid PVC (Table 5A), pigmented (TiO₂) rigid PVC (Table 5B), and Laminac 4123 polyester (Table 5C).

TABLE 5A.—COATING OF VIRGIN PVC WITH U.V. ABSORBER ON RIGID PVC

| U.V. absorber (5%) | Initial Yellow Index | ΔYI at 3,400 hours |
|---|---|---|
| UV-A | 3 | 11 |
| UV-B | 3 | 1 |
| UV-C | 3 | 2 |
| UV-E | 3 | 13 |
| UV-H | 3 | ¹29 |

¹ Sample reached ΔYI=15 at 2,900 hours

TABLE 5B.—COATING OF VIRGIN PVC WITH U.V. ABSORBER ON PIGMENTED RIGID PVC

| U.V. absorber (5%) | Initial Yellow Index | ΔYI at 3,500 hours |
|---|---|---|
| UV-A | 4 | 14 |
| UV-B | 3 | 3 |
| UV-C | 3 | 6 |
| UV-G | 2 | 14 |

TABLE 5C.—COATING OF VIRGIN PVC WITH U.V. ABSORBER ON LAMINAC 4123 POLYESTER

| U.V. absorber (5%) | ΔYI at 2,700 hours | ΔYI at 3,500 hours |
|---|---|---|
| Control (none) | 37 | 36 |
| UV-A | 5 | 4 |
| UV-B | 4 | 5 |
| UV-C | 6 | 5 |
| UV-E | 5 | 9 |

EXAMPLE 6

Using the procedure described in Example 1, additional determinations were made using various virgin PVC films having various U.V. absorbers as a coating over Lustran I-610 pigmented TiO₂ ABS polymer (Table 6A) and Cycolac pigmented (TiO₂) ABS (Table 6B).

TABLE 6A.—PIGMENTED ABS COATED WITH VIRGIN PVC HAVING 5% U.V. ABSORBER

| U.V. absorber | Initial Yellow Index | ΔYI at 2,200 hours |
|---|---|---|
| Control (none) | −4 | >27 |
| UV-A | −4 | 20 |
| UV-B | −4 | 7 |
| UV-C | −4 | 9 |
| UV-D | +3 | 11 |
| UV-E | −3 | 4 |
| UV-F | −4 | >30 |
| UV-G | −4 | 11 |
| UV-H | −3 | 15 |

TABLE 6B.—PIGMENTED ABS COATED WITH VIRGIN PVC HAVING 5% U.V. ABSORBER

| U.V. absorber | Initial Yellow Index | ΔYI at 3,000 hours |
|---|---|---|
| Control | 2 | ΔYI=20 at 1,400 hours |
| UV-A | 3 | 11 |
| UV-B | 3 | 10 |
| UV-C | 2 | 14 |
| UV-E | 3 | 7 |

EXAMPLE 7

Samples prepared by casting a 10% PVC in tetrahydrofuran solution onto microscope slides and then removing the film thus prepared, are exposed in a FS-BL unit. The two samples contained 5% U.V. absorber. Results are given in Table 7A.

TABLE 7A.—EFFECT OF U.V. ABSORBERS IN CAST PVC FILMS

| Sample | ΔYI 500 hours | ΔYI 950 hours |
|---|---|---|
| UV-A | 0 | 0 |
| UV-B | 0 | 0 |

For purposes of comparison, compression-molded films were prepared by preheating a PVC formulation sample between foil for three minutes at 200° C., pressing at 30 tons and air-cooling. The following formulation was used:

| | Parts |
|---|---|
| Geon 103 EP poly(vinyl chloride) | 10 |
| Thermolite 31 heat stabilizer | 0.2 |
| Stearic acid | 0.05 |
| U.V. absorber (where used) | 0.5 |

These samples were likewise exposed in the FS-BL unit. Results of 300 hours of exposure are presented in Table 7B.

TABLE 7B.—EFFECT OF ABSORBERS IN MOLDED PVC FILMS (2-3 MILS)

| Sample | ΔYI after 300 hours |
|---|---|
| Control (no absorber) | >25 |
| UV-A | 15 |
| UV-B | 3 |

As can be seen from this data, thin PVC films having a heat history attain a much greater degree of yellowness after exposure for only 300 hours than cast PVC films after three times the exposure.

EXAMPLE 8

A 10% solution of virgin PVC in tetrahydrofuran with five parts UV-B for every 100 parts of virgin PVC was coated with a brush onto the surface of a white, pigmented cellulosic print sheet which has been preimpregnated with a melamine-formaldehyde resin in the proportion of 44 parts melamine-formaldehyde solids and 56 parts paper. A sufficient amount of the above resin solution was applied to obtain a surface film of 6.5 g./ft.². The print sheet was coated in stages, allowing it to become untacky after each stage before the next coating was applied. After all the resin was applied to the print sheet, the latter was dried in an oven for 10 minutes at 65° C. and further for three minutes at 135° C.

The dried and coated cellulosic print sheet was incorporated in a laminating assembly consisting of (from the bottom up) five sheets of conventional phenolic resin-impregnated kraft paper and the coated print paper with the back-side of the print facing the phenolic kraft sheets. The entire assembly was then positioned between a pair of stainless steel press plates having a mirror polish finish, and placed in a laminating press. Pressing was at 600 p.s.i. until the plate temperature reached 100° C., then the pressure was reduced to 250 p.s.i., and lamination was for thirty minutes between 100 and 140° C. with a minimum of ten minutes at the latter temperature.

The resulting laminate, after being allowed to cool to room temperature, was removed from the press and had a smooth, glossy decorative surface. The bond at the different interfaces of the laminate was considered to be very good. On exposure in the fluorescent weatherometer for 2,000 hours, the surface color of the laminate remained relatively unchanged (ΔYI=−2.4). The minus ΔY.I. value indicates that this color change was a bleaching or whitening one, as opposed to the usual yellowing effect.

EXAMPLE 9

A 35.5 lb. basis weight water-laid acrylic fiber print sheet, about 6 mils thick, made up of fibrillated wet-spun filaments of a copolymer of 90 parts of acrylonitrile and 10 parts methylmethacrylate was coated on both sides with the PVC-U.V. absorber solution used in Example 8. Coating was done in stages in a similar fashion. When all the resin has been applied to the print sheet, a hair dryer was used to insure maximum drying. At the end of the coating and drying operations, the total resin pick-up of the print sheet was approximately 7.0 g./ft.², with the printed side of the print sheet obtaining about three times more resin than the back-side.

The dried and coated acrylic fiber sheet was incorporated in a laminating assembly consisting of (from the bottom up) a ⅛" sheet of rigid poly(vinyl chloride), and the print sheet with the back-face resting directly on the rigid PVC substrate.

The entire assembly was then positioned between a pair of stainless steel press plates having a mirror polish finish and laminated at 250 p.s.i. and 100–140° C. for twenty minutes, with at least 10 minutes at 140° C. The resulting laminate, after being allowed to cool to room temperature, was removed from the press and had a smooth, glossy decorative surface. The bond at different interfaces of the laminate was considered to be excellent. The laminate remained color stable after many hours of exposure in the fluorescent weatherometer unit.

I claim:
1. An article comprising a polymeric material which is sensitive to ultraviolet radiation and a coating on the surface of said material consisting essentially of virgin poly(vinyl chloride) with about 2.0% to 15% by weight of an ultraviolet light absorber dispersed homogeneously throughout the coating.
2. The article of claim 1 in which the ultraviolet absorber is present in a concentration of at least about 5%.
3. The article of claim 1 wherein the ultraviolet absorber is 2-hydroxy-4-methoxybenzophenone.
4. The article of claim 1 wherein the ultraviolet absorber is 2-(2-hydroxy-5-methylphenyl)benzotriazole.
5. The article of claim 1 wherein the ultraviolet absorber is 2-(2-hydroxy-4-methoxyphenyl)benzotriazole.
6. An article comprising in combination a polymeric material which is sensitive to ultraviolet radiation and on the surface of said polymeric material a surface-coating consisting essentially of (a) virgin poly(vinyl chloride) and (b) 2.0% to 15% by weight of an ultraviolet light absorber represented by the group consisting of 2-hydroxybenzophenones, 2-(2-hydroxyphenyl)benzotriazoles, aryl esters of aryl carboxylic acids, trisaryl triazines in which at least one aryl group has an o-hydroxy substituent, benzothiazoles, benzylidene-malonic esters, 1,2-dibenzoyl-3-arylguanidines and arylamino ethylenes.
7. The article of claim 6 wherein the light-sensitive polymeric material is rigid poly(vinyl chloride).
8. The article of claim 6 wherein the light-sensitive polymeric material is a copolymer of acrylonitrile, butadiene and styrene.
9. The article of claim 6 wherein the ultraviolet absorber is 2-hydroxy-4-methoxybenzophenone.
10. The article of claim 6 wherein the ultraviolet absorber is 2-(2-hydroxy-5-methylphenyl)benzotriazole.
11. The article of claim 6 wherein the ultraviolet absorber is 2-(2-hydroxy-4-methoxyphenyl)benzotriazole.
12. A heat and pressure consolidated decorative laminate comprising a rigid polymeric core member and a light protective surface coating on at least one side of said core, said coating consisting essentially of virgin poly(vinyl chloride) with about 2% to 15% by weight of an ultraviolet light absorber dispersed homogeneously throughout the coating.

References Cited

UNITED STATES PATENTS

| 2,568,894 | 9/1951 | Mackey | 117—33.3 X |
| 2,636,420 | 4/1953 | Ryan et al. | 117—33.3 X |
| 2,693,492 | 11/1954 | Hoch | 117—33.3 X |
| 2,763,566 | 9/1956 | Van Allan | 117—33.3 |
| 2,897,960 | 8/1959 | Revoir | 117—161 X |
| 3,004,896 | 10/1961 | Heller et al. | 117—33.3 X |
| 3,028,252 | 4/1962 | Mones et al. | 117—33.3 |
| 3,049,443 | 8/1962 | Coleman | 117—33.3 |
| 3,097,106 | 7/1963 | Blout et al. | 117—33.3 X |
| 3,113,880 | 12/1963 | Hoeschele et al. | 117—33.3 X |
| 3,322,555 | 5/1967 | Himmelmann et al. | 117—33.3 |

WILLIAM D. MARTIN, *Primary Examiner.*

U.S. Cl. X.R.

117—143, 138.8, 100, 161; 161—1; 260—45.7; 252—300